United States Patent [19]
Carter

[11] 3,782,149
[45] Jan. 1, 1974

[54] PROTECTIVE DEVICE FOR AUTOMOBILE DOOR HANDLE AND LOCKS

[76] Inventor: Carol Y. Carter, 1408 Gilbert Dr., Charleston, W. Va. 25302

[22] Filed: Feb. 17, 1972

[21] Appl. No.: 227,195

[52] U.S. Cl.................. 70/455, 70/424, 292/DIG. 2
[51] Int. Cl............................................. E05b 17/18
[58] Field of Search..................... 70/455, 423–428; 292/251.5, DIG. 2; 150/52 K, 52 L; 49/460

[56] References Cited
UNITED STATES PATENTS
3,434,318  3/1969  Thiry ................................ 70/455
3,147,176  9/1964  Haslam ............................. 161/39

Primary Examiner—Robert L. Wolfe
Attorney—Elmer R. Helferich et al.

[57] ABSTRACT

A device for covering automobile door handles and locks thereby protecting them against freezing. This device is defined by a housing having an edge surface comprising magnetic element sealably bonded thereto in order to secure the housing in position to the exterior surface of the automobile door. The housing is internally insulated thereby affording further protection against the elements.

4 Claims, 4 Drawing Figures

3,782,149

PROTECTIVE DEVICE FOR AUTOMOBILE DOOR HANDLE AND LOCKS

BACKGROUND OF THE INVENTION

1. Field of Invention

This invention relates to protective devices and is particularly related to a device which is uniquely adapted to protect automobile door handles and locks against freezing. More specifically, the present invention is concerned with a protective device of the type herein described, comprising magnetic element for its securement to the exterior surface of the automobile door.

2. The Prior Art

It is a matter of common experience that automobile door locks are extremely difficult to unlock during the winter months due to frozen elements which become lodged therein. In order to unlock such frozen automobile door locks they must either be heated, or some auxiliary mechanical tool is employed to pry loose the frozen elements from the interior as well as the exterior of the locks. These means, however, are both time consuming and cumbersome.

A cover for automobile door handles is desired in U.S. Pat. No. 1,830,383 (G. H. Bos) which comprises a resilient body having an opening on one side and is placed on the door handle by stretching and slipping it thereover. The cover disclosed in this patent is employed for the purpose of protecting the door handles while the automobile is being repaired or being handled by the mechanic (Col. 1, ls. 1–6 and Col. 2, ls. 53–60). It is evident from the disclosure of this patent that the device described therein does not afford protection for automobile door handles and locks against freezing nor is it intended for such application.

There are some patents which disclose the use of magnetic elements in various environments for the purpose of achieving a sealing relationship between two surfaces, one of which is a metallic surface. Such patents include U.S. Pat. No. 2,603,843 issued to G. S. Hill on July 22, 1952 and U.S. Pat. No. 3,147,176 issued to J. E. Haslam on Sept. 1, 1964. However, these patents relate to structures and devices which are neither analogous nor bear any relationship to the protective device disclosed herein.

SUMMARY OF THE INVENTION

The present invention is directed to a device which is uniquely suitable for covering automobile door handles and locks and protects them against the elements during the winter months. This device is defined by a housing in the form of an enclosure having an edge surface comprising magnetic element which insures sealing engagement between the device and the exterior surface of the automobile door thereby protecting the door handles and locks and preventing the elements from becoming lodged therein.

These and other aspects of the device of this invention will be more clearly comprehended from the following detailed description taken in connection with the accompanying drawings.

THE DRAWINGS

In the drawings, FIG. 1 is a side view of the protective device employed in this invention;

Like numerals are employed in the drawings to designate like parts.

DETAILED DESCRIPTION OF THE INVENTION

Figure 1:
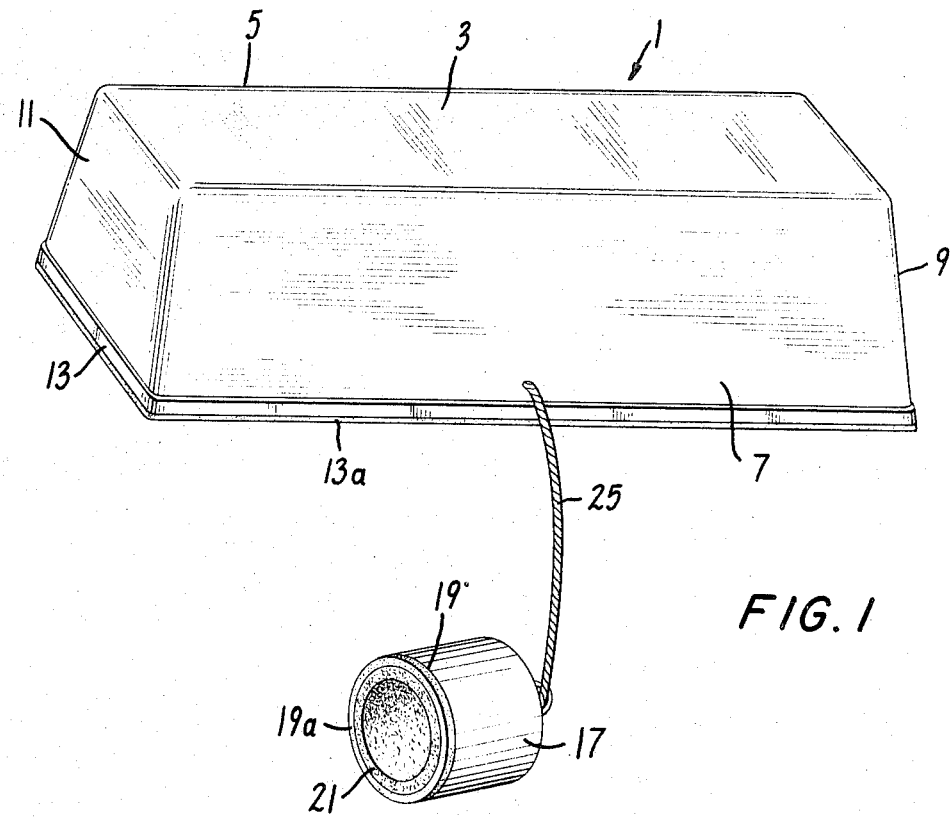
Figure 2:
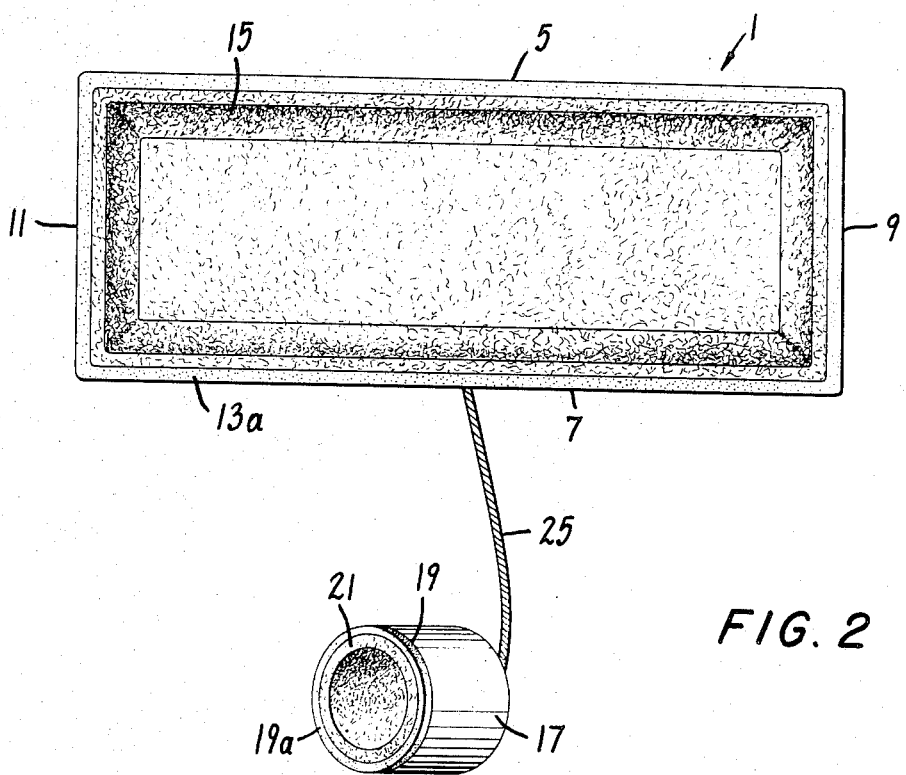
FIG. 2 is a top view of the device shown in FIG. 1.

Referring now to the drawings, particularly to FIGS. 1 and 2, there is shown a housing 1, having a top panel 3, opposed side walls 5 and 7, and opposed end walls 9 and 11, which walls terminate at the lower end of the housing 1 in an encircling surface or flange 13. A magnetic element 13a such as a strip of magnetic material is adhesively bonded to and preferably completely or substantially completely covers the aforesaid flange so that the housing can be magnetically secured to the exterior surface of the automobile door. Alternatively, a plurality of magnetic elements (not shown) may be bonded along the aforesaid edge surface (or flange) in spaced relation, although a more effective seal is provided between the housing 1 and the exterior surface of the automobile door when a continuous strip of a magnetic material is bonded to the aforesaid edge surface as hereinbefore described.

The housing 1 may be conveniently constructed of a rigid or semi-rigid material having extremely low thermal conductivity such as various plastics (e.g., polyethylene, polystyrene, polyvinylchloride, etc.) or other similar materials in order to afford the door locks and handle the necessary protection against freezing. However, and in order to improve the protection efficiency of this device the housing 1 is preferably lined internally with an insulative material 15 such as asbestos, felt, or any other similar materials. The insulative material 15 conformably contours the inside of the housing 1 and is bonded thereto adhesively or by any other means known to those skilled in the art.

The thickness of the insulative material 15 is not, per se, critical in this invention and may generally range from about one-eighth to about one-half of an inch.

While in some automobiles the lock may be an integral part of the door handle, there are many models in which the automobile door lock is not an integral part of the door handle, but rather, it is placed slightly below this handle. In such instances the door lock may be covered by a protective device such as shown in FIGS. 1 and 2 which comprises a housing 17 (shown in perspective) having the general configuration represented in these figures although said housing may also be of some other geometrical configuration. The housing 17 is also defined by a flange such as 19 which, as in the case of the housing 1 for the door handle, also comprises a magnetic element such as a continuous strip of magnetic material 19a adhesively bonded thereto in order to insure its secure engagement to the exterior surface of the automobile door.

Also, as in the aforesaid description in connection with the housing 1, the housing 17 may be lined internally with an insulative material 21 such as asbestos, felt, etc. in order to afford the added protection against freezing. The insulative material 21 conformably contours the inside of the housing 17 and is bonded thereto as described in connection with the housing 1.

The material of construction for the housing 17 and the thickness of the insulative material 21 may also be the same as those described in connection with the housing 1.

Figure 3:
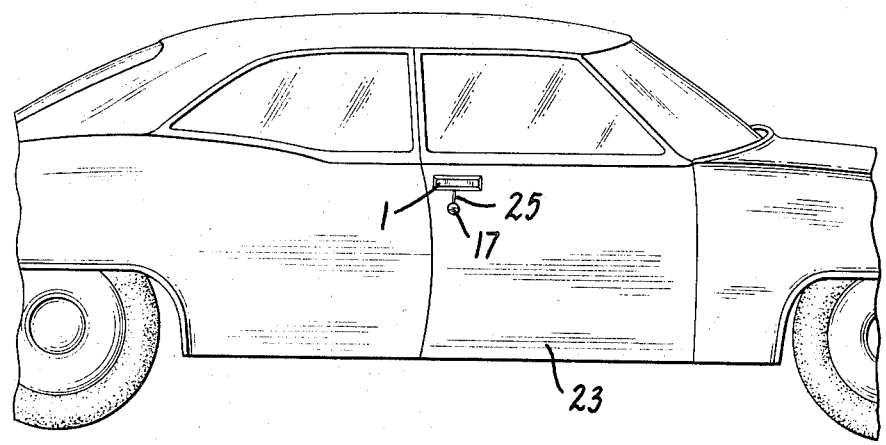
FIG. 3 is a partial side view of an automobile door showing the manner in which the device of this invention is placed in position during its use.

The device of this invention may be conveniently provided as a combination door handle cover — lock cover in which event it may be useful for all types of automobiles. The manner in which such combination device is secured to the exterior surface of an automobile door is shown in FIG. 3 which depicts a partial side view of the exterior surface of an automobile door 23 with the combination housing 1 and housing 17 secured thereto. When using these housings in combination, a connecting means 25 may be employed for connecting one housing to the other such as shown in the drawings. Such connecting means may be a string of plastic or elastic material, fiber, filament or any other similar means so that when the device is placed in position, housings 1 and 17 completely enclose the door handle and door lock, respectively.

If desired, the connecting means 25 may be an elastic material which is shorter than the distance between the door handle and door lock. Thus, either housing may be slipped over the door handle, and the other housing then placed in position by simply stretching the connecting means to the desired length.

Figure 4:
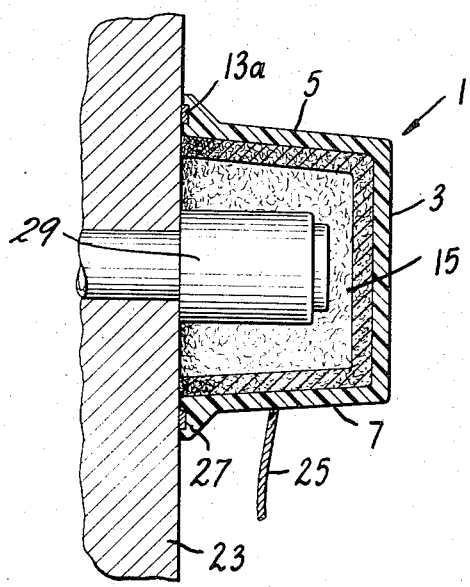
FIG. 4 is a side view, partly in section, of the device depicted in FIG. 1, shown in protective position relative to an automobile door lock.

In the embodiment depicted in FIG. 1, flange 13 is shown as an integral part of the housing 1. In still another embodiment of this invention, shown in FIG. 4, the housing 1 may be additionally provided with a separate flange 27 in order to further insure against the entry of the elements into lock 29. Similarly, the housing 17 may also be provided with a separate flange in the manner described in connection with the housing 1.

When using such additional flanges, the underside surface of these flanges must be provided with a magnetic material, sealably or otherwise bonded thereto, for secure engagement with the exterior surface of the automobile door.

While the device of this invention has heretofore been described with some degree of particularity, it must be mentioned that numerous modifications may be made therein without necessarily departing from the spirit or scope of this invention. Such modifications, for example, may relate to the geometrical configuration of the respective housings, the selection of particular materials for the construction of the housings, the insulative materials, etc. Such modifications do not, however, affect the character of this invention.

Also, while the device of this invention has been specifically described in connection with its use for automobile door handles and locks, it may be also employed for protecting door handles, locks and other similar items against the elements.

What is claimed is:

1. In a door having a ferromagnetic surface and a handle protruding from said surface, a lock adjacent said handle, a device for protecting said handle and said lock against the elements which device comprises:
   a. A first housing for said handle, said first housing having an edge surface,
   b. a separate second housing adapted to be mounted adjacent to said first housing, said second housing having an edge surface,
   c. means for connecting said first housing to said second housing, and
   d. magnetic elements bonded respectively to said edge surface of said first housing and said second housing for securing said housings to said door surface while said first housing encircles said door handle and said second housing encircles said lock.

2. A device as in claim 1 wherein said first housing is defined by a top panel, opposed side walls and opposed end walls, said walls terminating in an edge surface at the lower end of said housing.

3. A device as in claim 1 wherein said edge surfaces of said first housing and second housing extend laterally of the planar surfaces of said housings.

4. A device as in claim 2 wherein said edge surfaces of said first housing and said second housing extend laterally of the planar surfaces of said housings.

* * * * *